US012211084B2

(12) United States Patent
Tang et al.

(10) Patent No.: US 12,211,084 B2
(45) Date of Patent: *Jan. 28, 2025

(54) METHODS FOR PROVIDING A RECOMMENDATION

(71) Applicant: Capital One Services, LLC, McLean, VA (US)

(72) Inventors: Qiaochu Tang, Frisco, TX (US); Michelle Emamdie, Saint Augustine, FL (US); Jiaxin Guo, Austin, TX (US); Jeremy Huang, Allen, TX (US); Derek Bumpas, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,104

(22) Filed: Dec. 23, 2022

(65) Prior Publication Data
US 2023/0137231 A1 May 4, 2023

Related U.S. Application Data

(63) Continuation of application No. 16/905,192, filed on Jun. 18, 2020, now Pat. No. 11,562,418.

(51) Int. Cl.
*G06Q 30/0601* (2023.01)
*G06N 20/00* (2019.01)
*G06Q 10/087* (2023.01)

(52) U.S. Cl.
CPC ......... *G06Q 30/0631* (2013.01); *G06N 20/00* (2019.01); *G06Q 10/087* (2013.01); *G06Q 30/0643* (2013.01)

(58) Field of Classification Search
CPC ............ G06Q 30/0631; G06Q 30/0601–0643
See application file for complete search history.

(56) References Cited

U.S. PATENT DOCUMENTS 9,317,835 B2  4/2016  Calman et al.
10,095,754 B1  10/2018  DiBenedetto et al.
(Continued)

OTHER PUBLICATIONS

Chen, B., et. al. "Image processing operations identification via convolutional neural network." Science China Information Sciences. vol. 63, pp. 1869-1919. (Year: 2017).*

(Continued)

*Primary Examiner* — Allison G Wood
*Assistant Examiner* — Katherine A Barlow
(74) *Attorney, Agent, or Firm* — Bookoff McAndrews, PLLC

(57) ABSTRACT

A computer-implemented method for providing a vehicle recommendation to a user may include: obtaining one or more vehicle images via a device associated with the user; identifying one or more user-selected images of the one or more vehicle images based on user interaction with the one or more vehicle images performed by the user via a user interface; identifying one or more first-level attributes from the one or more user-selected images; obtaining one or more vehicle identifications from the one or more user-selected images; determining one or more second-level attributes based on the one or more vehicle identifications; determining a value of each of the one or more first-level attributes and the one or more second-level attributes; determining the vehicle recommendation based on the value; and transmitting, to the device associated with the user, a notification indicating the vehicle recommendation.

16 Claims, 7 Drawing Sheets

(56) References Cited

U.S. PATENT DOCUMENTS

| | | | |
|---|---|---|---|
| 10,339,586 B1* | 7/2019 | Khobragade | G06Q 30/0631 |
| 10,395,298 B2* | 8/2019 | Berg | G06Q 30/0631 |
| 11,004,128 B1 | 5/2021 | Mishra | |
| 2014/0067615 A1 | 3/2014 | Park et al. | |
| 2015/0199743 A1 | 7/2015 | Pinel et al. | |
| 2015/0310300 A1 | 10/2015 | Hou et al. | |
| 2016/0179847 A1 | 6/2016 | Epstein et al. | |
| 2017/0364992 A1* | 12/2017 | Noguchi | G06Q 30/0282 |
| 2018/0285957 A1 | 10/2018 | Ng et al. | |
| 2019/0220479 A1* | 7/2019 | Epstein | G06Q 30/0625 |
| 2019/0287154 A1 | 9/2019 | Kakinuma | |
| 2021/0048931 A1 | 2/2021 | Barzelay et al. | |
| 2021/0049442 A1* | 2/2021 | Menon | G06N 3/04 |
| 2021/0166103 A1* | 6/2021 | Jackson | G06N 3/088 |
| 2021/0182287 A1* | 6/2021 | Agarwal | G06N 3/045 |
| 2021/0224666 A1 | 7/2021 | Kawashima et al. | |
| 2021/0358022 A1* | 11/2021 | Sun | G06Q 30/0643 |

OTHER PUBLICATIONS

McAuley, J., et. al. "Image-based Recommendations on Styles and Substitutes." SIGIR 'Aug. 9-13, 2015, Santiago, Chile. http://dx.doi.org/10.1145/2766462.2767755. (Year: 2015).*

Tang, J., et. al. "Personalized Top-N Sequential Recommendation via Convolutional Sequence Embedding." WSDM '18, Feb. 5-9, 2018, Marina Del Rey, CA, USA. DOI: 10.1145/3159652.3159656. (Year: 2018).*

Yuan, F., et. al. "A Simple Convolutional Generative Network for Next Item Recommendation." In Proceedings of the Twelfth ACM International Conference on Web Search and Data Mining (WSDM '19). Association for Computing Machinery, New York, NY, USA, 582-590. (Year: 2019).*

Hossain, Anwar et. al. "Classification of Image using Convolutional Neural Network (CNN)" Global Journal of Computer Science and Technology. vol. XIX Issue II Version I. (Year: 2019).

Pedronette, Daniel et. al. "Semi-Supervised Learning for Relevance Feedback on Image Retrieval Tasks" 27th SIBGRAPI Conference on Graphics, Patterns and Images. IEEEXplore.com (Year: 2014).

Hardesty, Larry. "Improving recommendation systems" News.MIT.edu (Year: 2011).

Columbus, Louis. "10 Ways AI is Improving Manufacturing in 2020" Forbes.com (Year: 2020).

* cited by examiner

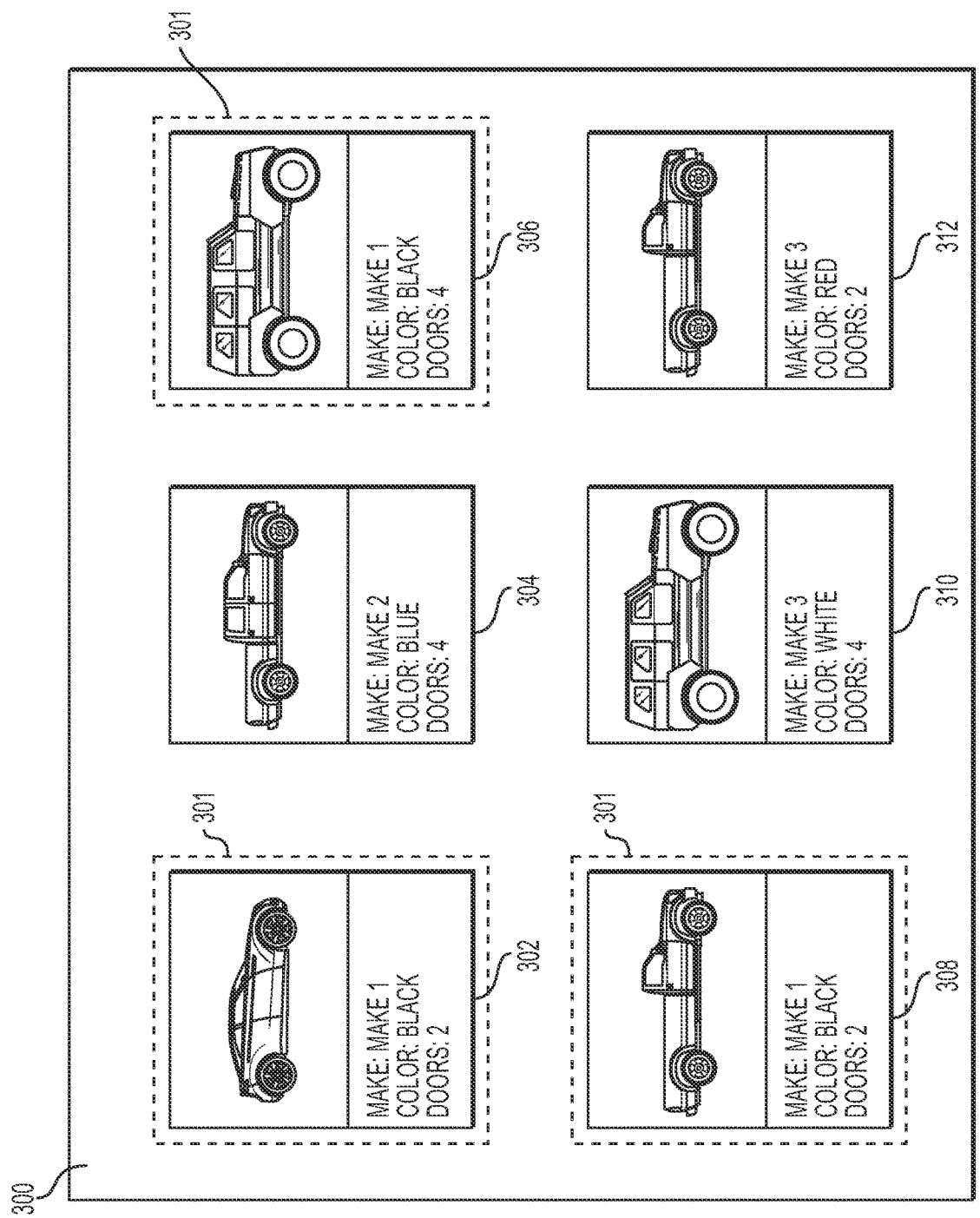

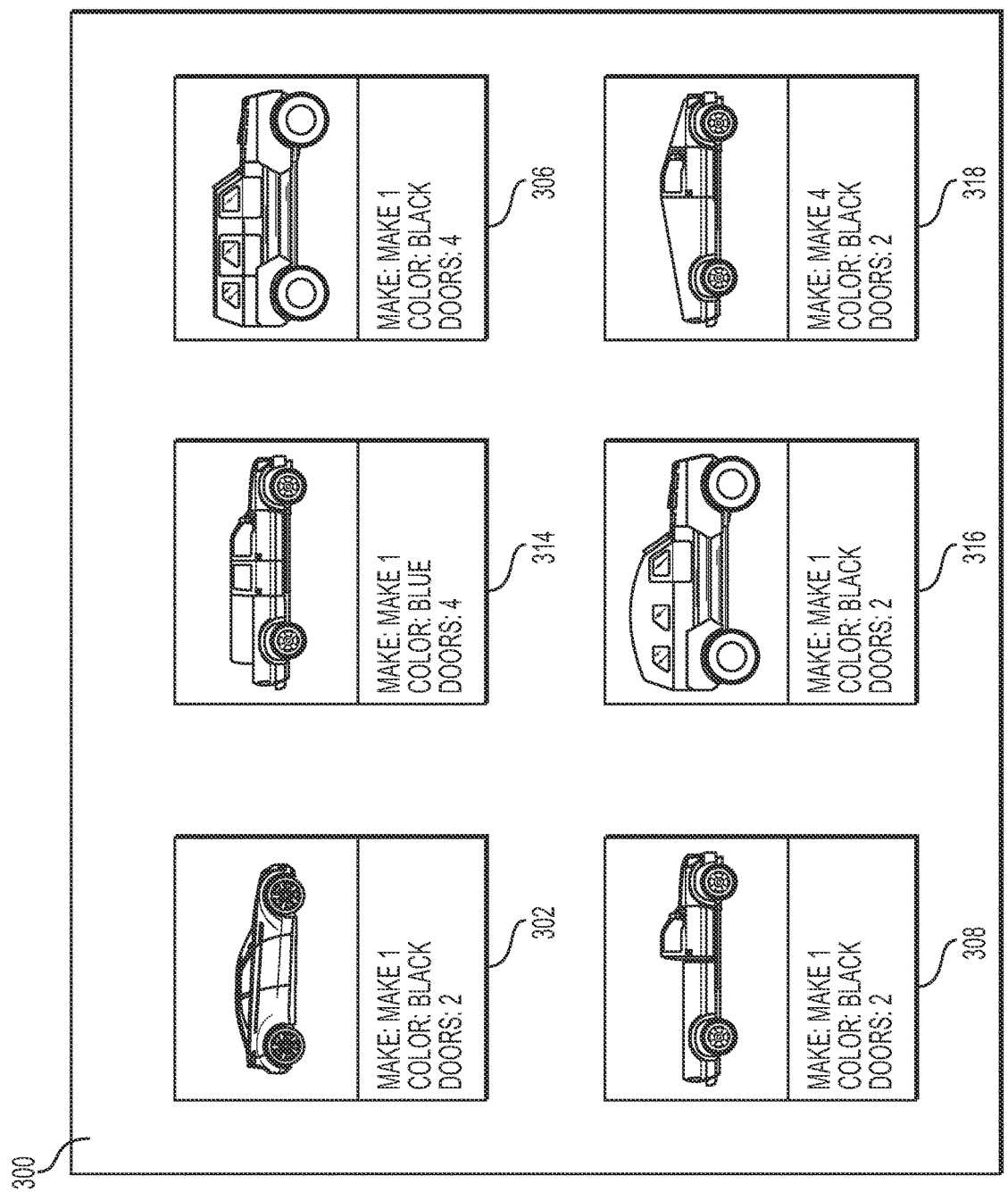

METHODS FOR PROVIDING A RECOMMENDATION

CROSS-REFERENCE TO RELATED APPLICATION(S)

This patent application is a continuation of, and claims the benefit of priority to, U.S. Nonprovisional patent application Ser. No. 16/905,192, filed on Jun. 18, 2020, the entirety of which is incorporated herein by reference.

TECHNICAL FIELD

Various embodiments of the present disclosure relate generally to providing a recommendation to a user, and, more particularly, to providing a vehicle recommendation to a user.

BACKGROUND

Purchasers of relatively expensive items, such as vehicles, real estate, mattresses, boats, computers, etc. may conduct part or all of their shopping for such items online, via the Internet (e.g., via one or more online search user-interfaces). Such expensive items often have numerous optional features or attributes which may impact an overall cost of the item. In the context of a vehicle purchase, for example, a purchaser (e.g., a buyer or user) may weigh the cost of the vehicle against the various features or attributes of that vehicle. In so doing, some of the features or attributes may be determined more favorable to the purchaser than other features or attributes (e.g., some features may be categorized as "must have features," while other features may be categorized as "like to have features" or "unneeded features"). Because each purchaser may have his/her own unique preference of available features or attributes, it can be difficult for the purchaser to convey such preference information with traditional, often rigid, online search user interfaces. Consequently, the buyer/user may spend a significant amount of time researching vehicles before making a purchasing decision, which may lead to purchaser dissatisfaction and/or disengagement.

The present disclosure is directed to overcoming the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing a vehicle recommendation to a user. The disclosed methods and systems may improve a user's experience when making a purchasing decision, and may improve efficiency during the process of purchasing a vehicle.

In an aspect, a computer-implemented method for providing a vehicle recommendation to a user may include: obtaining, via one or more processors, one or more vehicle images via a device associated with the user; identifying, via the one or more processors, one or more user-selected images of the one or more vehicle images based on user interaction with the one or more vehicle images performed by the user via a user interface displayed on the device associated with the user; identifying, via the one or more processors, one or more first-level attributes from the one or more user-selected images, wherein the one or more first-level attributes include at least one of a make, a model, a color, a door count, or a seat count of one or more vehicles indicated via the one or more user-selected images; obtaining, via the one or more processors, one or more vehicle identifications from the one or more user-selected images; determining, via the one or more processors, one or more second-level attributes based on the one or more vehicle identifications, wherein the one or more second-level attributes include at least one of an engine type, a manufacturing region, or a manufacturing year of the one or more vehicles indicated via the one or more user-selected images; determining, via the one or more processors, a value of each of the one or more first-level attributes and the one or more second-level attributes via one or more algorithms; determining, via the one or more processors, the vehicle recommendation based on the value of each of the one or more first-level attributes and the one or more second-level attributes; and transmitting, to the device associated with the user, a notification indicating the vehicle recommendation.

In another aspect, a computer-implemented method for providing a vehicle recommendation to a user may include: obtaining, via one or more processors, one or more vehicle images via a device associated with the user; identifying, via the one or more processors, one or more user-selected images of the one or more vehicle images based on user interaction with the one or more vehicle images performed by the user via a user interface displayed on the device associated with the user; identifying, via the one or more processors, one or more first-level attributes from the one or more user-selected images, wherein the one or more first-level attributes include at least one of a make, a model, a color, a door count, or a seat count of one or more vehicles indicated via the one or more user-selected images; obtaining, via the one or more processors, one or more vehicle identifications from the one or more user-selected images; determining, via the one or more processors, one or more second-level attributes based on the one or more vehicle identifications, wherein the one or more second-level attributes include at least one of an engine type, a manufacturing region, or a manufacturing year of the one or more vehicles indicated via the one or more user-selected images; determining, via the one or more processors, a value of each of the one or more first-level attributes and the one or more second-level attributes via one or more algorithms; generating, via the one or more processors, user preference data based on the value of each of the one or more first-level attributes and the one or more second-level attributes via one or more algorithms and a predetermined threshold value; determining, via the one or more processors, the vehicle recommendation based on the user preference data via a trained machine learning algorithm; and transmitting, to the device associated with the user, a notification indicating the vehicle recommendation, wherein the notification includes an interactive feature configured to enable the user to accept or reject the vehicle recommendation, wherein the notification is configured to be displayed on the user interface of the device associated with the user.

In yet another aspect, a computer system for providing a vehicle recommendation to a user may include a memory storing instructions, and one or more processors configured to execute the instructions to perform operations. The operations may include: obtaining one or more vehicle images via a device associated with the user; identifying one or more user-selected images of the one or more vehicle images based on user interaction with the one or more vehicle images performed by the user via a user interface displayed on the device associated with the user; identifying one or more first-level attributes from the one or more user-selected images, wherein the one or more first-level attributes include at least one of a make, a model, a color, a door count, or a seat count of one or more vehicles indicated via the one or more user-selected images; obtaining one or more vehicle identifications from the one or more user-selected images; determining one or more second-level attributes based on the one or more vehicle identifications, wherein the one or more second-level attributes include at least one of an engine type, a manufacturing region, or a manufacturing year of the one or more vehicles indicated via the one or more user-selected images; determining a value of each of the one or more first-level attributes and the one or more second-level attributes via one or more algorithms; determining the vehicle recommendation based on the value of each of the one or more first-level attributes and the one or more second-level attributes; and transmitting, to the device associated with the user, a notification indicating the vehicle recommendation.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A-3B depict a graphical representation of an exemplary user interface provided on a user device of FIG. 1, the user interface enabling a user to interact with one or more vehicle images, according to one or more embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as one or more vehicle images, one or more user-selected images, one or more vehicle identifications, one or more first-level attributes, or one or more second-level attributes may be used to determine a vehicle recommendation for the user.

Figure 1:
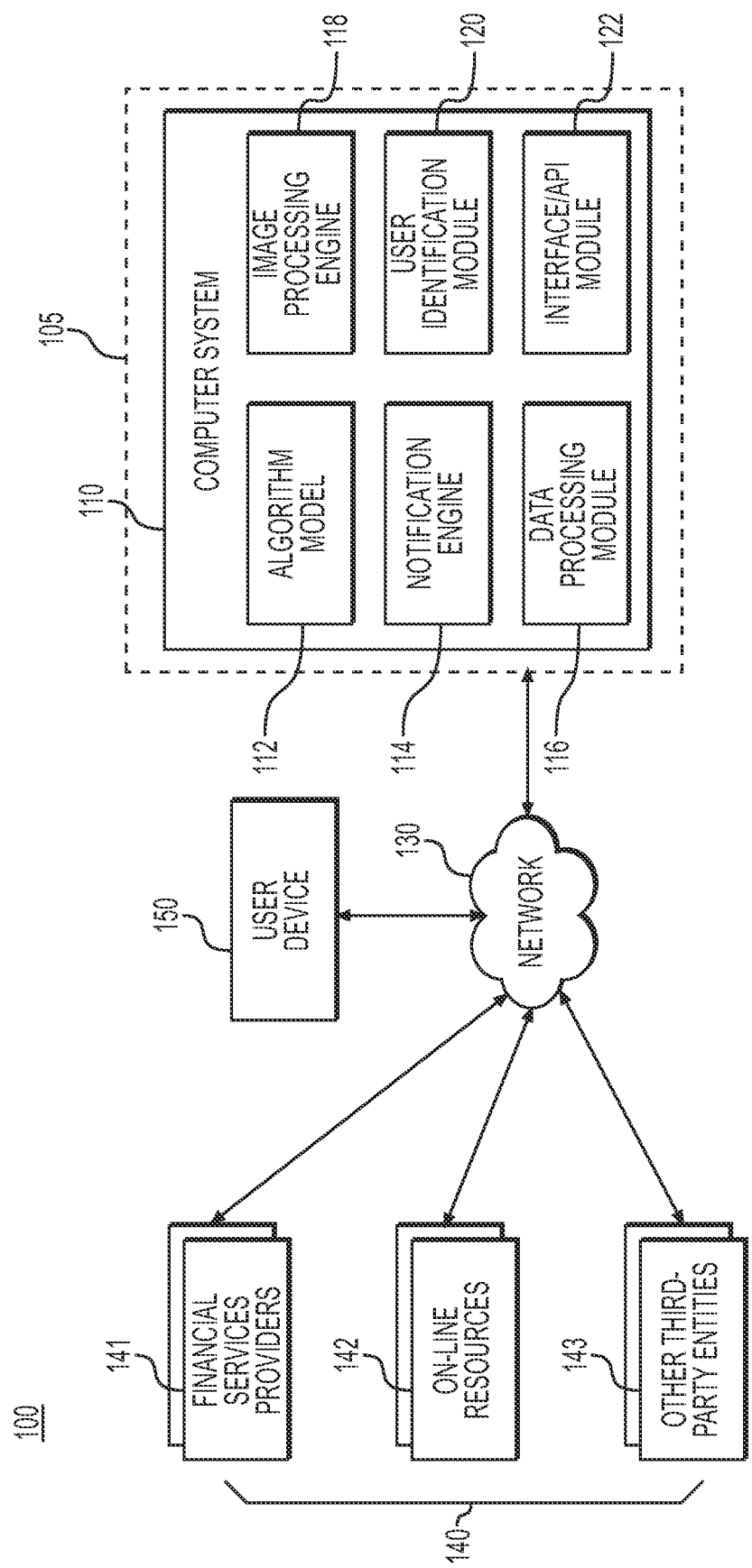
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, a network 130, one or more resources for collecting data 140 (e.g., one or more vehicle identifications), and a user device (or a device associated with a user) 150. The one or more resources for collecting data 140 may include financial services providers 141, on-line resources 142, or other third-party entities 143. These components may be in communication with one another via network 130.

The computer system 110 may have one or more processors configured to perform methods described in this disclosure. The computer system 110 may include one or more modules, models, or engines. The one or more modules, models, or engines may include an algorithm model 112, a notification engine 114, a data processing module 116, an image processing engine 118, a user identification module 120, and/or an interface/API module 122, which may each be software components stored in the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

The algorithm model 112 may be a plurality of algorithm models. The algorithm model 112 may include a trained machine learning model. Details of algorithm model 112 are described elsewhere herein. The notification engine 114 may be configured to generate and communicate (e.g., transmit) one or more notifications (e.g., vehicle recommendations) to a user device 150 or to one or more resources 140 through the network 130. The data processing module 116 may be configured to monitor, track, clean, process, or standardize data (e.g., one or more user-selected images) received by the computer system 110. One or more algorithms may be used to clean, process, or standardize the data. The image processing engine 118 may be configured to monitor, track, clean, process, or standardize image data. Such image data may include any images taken by the user or individuals other than the user, or any images stored in databases associated with one or more resources 140. The user identification module 120 may manage user identification for each user accessing the computer system 110. In one implementation, the user identification associated with each user may be stored to, and retrieved from, one or more components of data storage associated with the computer system 110 or one or more resources 140. The interface/API module 122 may allow the user to interact with one or more modules, models, or engines of the computer system 110.

Computer system 110 may be configured to receive data from other components (e.g., one or more resources 140, or user device 150) of the system environment 100 via network 130. Computer system 110 may further be configured to utilize the received data by inputting the received data into the algorithm model 112 to produce a result (e.g., a vehicle recommendation). Information indicating the result may be transmitted to user device 150 or one or more resources 140 over network 130. In some examples, the computer system 110 may be referred to as a server system that provides a service including providing the information indicating the received data and/or the result to one or more resources 140 or user device 150.

Network 130 may be any suitable network or combination of networks and may support any appropriate protocol suitable for communication of data to and from the computer system 110 and between various other components in the system environment 100. Network 130 may include a public network (e.g., the Internet), a private network (e.g., a network within an organization), or a combination of public and/or private networks. Network 130 may be configured to provide communication between various components depicted in FIG. 1. Network 130 may comprise one or more networks that connect devices and/or components in the network layout to allow communication between the devices and/or components. For example, the network 130 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 130 may be implemented using cell and/or pager networks, satellite, licensed radio, or a combination of licensed and unlicensed radio.

Financial services providers 141 may be an entity such as a bank, credit card issuer, merchant services providers, or other type of financial service entity. In some examples, financial services providers 141 may include one or more merchant services providers that provide merchants with the ability to accept electronic payments, such as payments using credit cards and debit cards. Therefore, financial services providers 141 may collect and store data pertaining to transactions occurring at the merchants. In some embodiments, financial services providers 141 may provide a platform (e.g., an app on a user device) that a user can interact with. Such user interactions may provide data (e.g., user preference data) that may be analyzed or used in the method disclosed herein. The financial services providers 141 may include one or more databases to store any information related to the user or the vehicle recommendation. The financial services providers 141 may provide services associated with vehicle transactions.

Online resources 142 may include webpage, e-mail, apps, or social networking sites. Online resources 142 may be provided by manufacturers, vehicle dealers, retailers, consumer promotion agencies, and other entities. For example, online resources 142 may include a webpage that users can access to select, buy, or sell a vehicle. Online resources 142 may include other computer systems, such as web servers, that are accessible by computer system 110.

Other third-party entities 143 may be any entity that is not a financial services provider 141 or online resources 142. Other third-party entities 143 may include merchants that may each be an entity that provides products. The term "product," in the context of products offered by a merchant, encompasses both goods and services, as well as products that are a combination of goods and services. A merchant may be, for example, a retailer, a vehicle dealer, a grocery store, an entertainment venue, a service provider, a restaurant, a bar, a non-profit organization, or other type of entity that provides products that a consumer may consume. A merchant may have one or more venues that a consumer may physically visit in order to obtain the products (goods or services) offered by the merchant. In some embodiments, other third-party entities 143 may provide a platform (e.g., an app on a user device) with which a user can interact. Such user interactions may provide data (e.g., one or more user-selected images) that may be analyzed or used in the method disclosed herein.

The financial services providers 141, the online resources 142, or any other type of third-party entity 143 may each include one or more computer systems configured to gather, process, transmit, and/or receive data. In general, whenever any of financial services providers 141, the online resources 142, or any other type of third-party entity 143 is described as performing an operation of gathering, processing, transmitting, or receiving data, it is understood that such operations may be performed by a computer system thereof. In general, a computer system may include one or more computing devices, as described in connection with FIG. 5 below.

User device 150 may operate a client program, also referred to as a user application or third-party application, used to communicate with the computer system 110. The client program may be provided by the financial services providers 141, the online resources 142, or any other type of third-party entity 143. This user application may be used to accept user input or provide information (e.g., one or more vehicle images) to the computer system 110 and to receive information from the computer system 110. In some examples, the user application may be a mobile application that is run on user device 150. User device 150 may be a mobile device (e.g., smartphone, tablet, pager, personal digital assistant (PDA)), a computer (e.g., laptop computer, desktop computer, server), or a wearable device (e.g., smart watch). User device 150 can also include any other media content player, for example, a set-top box, a television set, a video game system, or any electronic device capable of providing or rendering data. User device 150 may optionally be portable. The user device 150 may be handheld. User device 150 may be a network device capable of connecting to a network, such as network 130, or other networks such as a local area network (LAN), wide area network (WAN) such as the Internet, a telecommunications network, a data network, or any other type of network.

Computer system 110 may be part of an entity 105, which may be any type of company, organization, or institution. In some examples, entity 105 may be a financial services provider 141. In such examples, the computer system 110 may have access to data pertaining to transactions through a private network within the entity 105. For example, if the entity 105 is a card issuer, entity 105 may collect and store data involving a credit card or debit card issued by the entity 105. In such examples, the computer system 110 may still receive data from other financial services providers 141.

Figure 2:
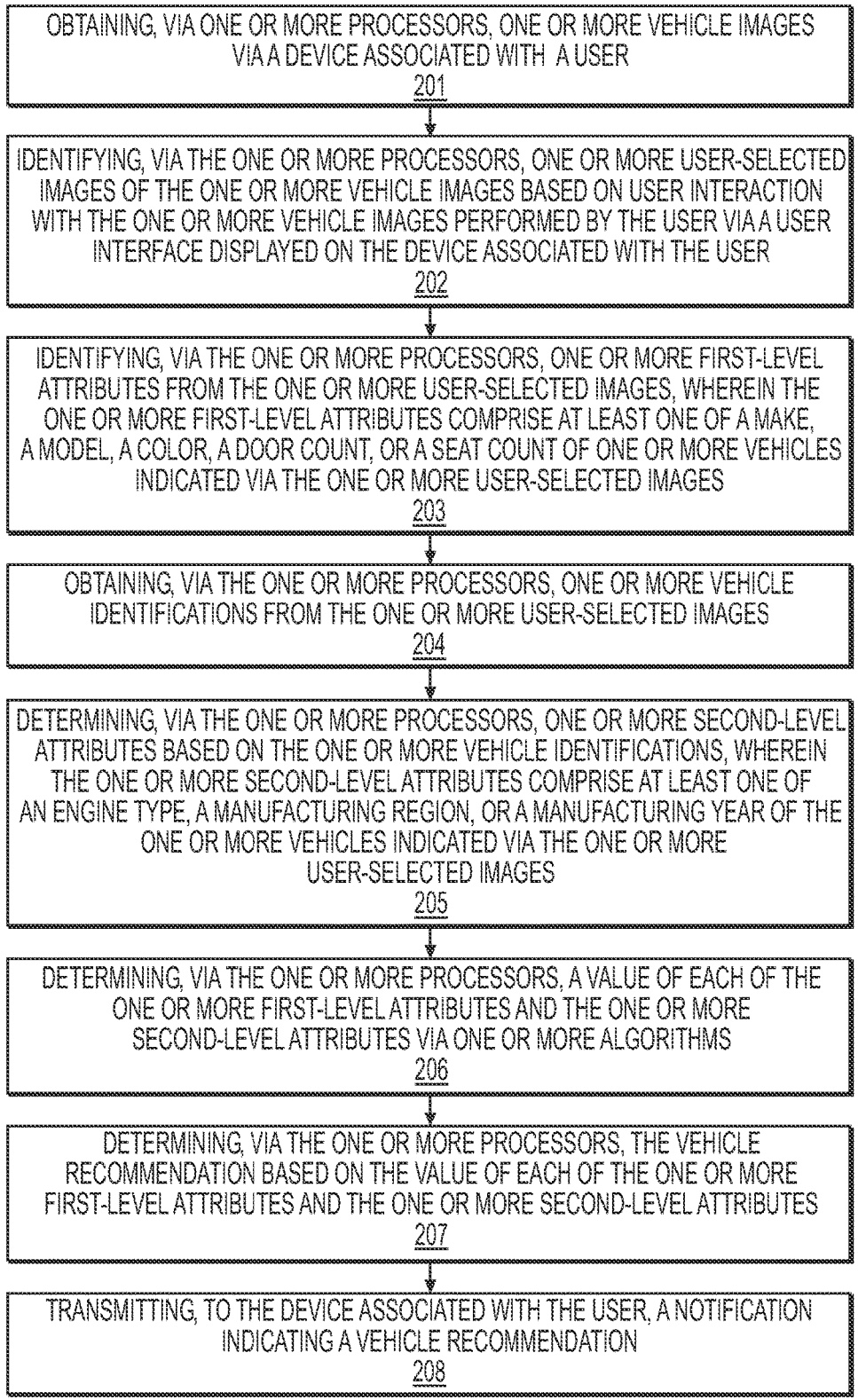
FIG. 2 depicts a flowchart of an exemplary method of providing a vehicle recommendation to a user, according to one or more embodiments.

FIG. 2 is a flowchart illustrating a method for providing a vehicle recommendation to a user, according to one or more embodiments of the present disclosure. The method may be performed by computer system 110.

Step 201 may include obtaining, via one or more processors, one or more vehicle images via a device associated with the user. A given vehicle image of the one or more vehicle images may include at least a picture of a vehicle. The one or more vehicle images may include at least one of a front side image, a back side image, a left side image, or a right side image of a vehicle. The one or more vehicle images may include an image of a vehicle from an angle. For instance, the image may include an image of the vehicle taken from a 45-degree angle relative to the horizontal plane parallel to the floor. In some embodiments, the one or more vehicle images may be obtained via an imaging device. For instance, a mobile phone or other type of electronic device including an imaging device may be used to take photos or images of a vehicle. The imaging device can include hardware and/or software elements. In some embodiments, the imaging device may be a camera operably coupled to, or included within, the user device 150. The imaging device can be controlled by an application/software configured to display the three-dimensional modeling tool. The one or more vehicle images may be stored in one or more databases associated with one or more resources 140 (e.g., a financial services provider 141) or entity 105. The device associated with the user 150 may be configured to access the one or more databases and display one or more vehicle images to the user. The one or more vehicle images may be a set of all the vehicle images stored in the one or more databases. The one or more vehicle images displayed to the user may be randomly selected among all the vehicle images stored in the one or more databases. In some embodiments, the one or more vehicle images displayed to the user may be determined via one or more algorithms (e.g., a trained machine learning algorithm of algorithm model 112) based on user interaction with one or more vehicle images.

Step 202 may include identifying, via the one or more processors, one or more user-selected images of the one or more vehicle images based on user interaction with the one or more vehicle images performed by the user via a user interface displayed on the device associated with the user. For instance, the one or more vehicle images may be presented to the user via the user interface display on the device associated with the user 150, and the user may click on (e.g., select, denote, highlight, identify, or otherwise mark) a subset of the one or more vehicle images so as to define the subset of the one or more vehicle images as the one or more user-selected images. The one or more user-selected images may be identified by the user via one or more user interactions with the one or more vehicle images displayed on a user interface of the device associated with the user 150. The user interactions may include clicking on (selecting, denoting, highlighting, identifying, or otherwise marking) an image, link, or button displayed on a display of the device associated with the user. The device associated with the user may be capable of accepting inputs of a user via one or more interactive components of the user device, such as a keyboard, button, mouse, touchscreen, touchpad, joystick, trackball, camera, microphone, or motion sensor input (e.g., an input device 550 as described in connection with FIG. 5, below). One or more user interfaces (e.g., a website) may interact with the user to collect the one or more user-selected images. For instance, the user may type any information related to the one or more user-selected images via a keyboard provided on the display of the device associated with the user 150 or otherwise in communication with the device associated with the user 150. In another example, the user may click on one or more interactive components associated with the one or more vehicle images displayed on a display of the user device 150 to select the one or more user-selected images.

FIGS. 3A-3B illustrate graphical representations of an exemplary user interface 300 configured for display via user device 150 of FIG. 1, and enabling the user to interact with the one or more vehicle images. The user interface may be associated with software installed on the user device 150, or may be made available to the user via a website or application. The user can interact with such user interface 300 to select one or more vehicle images 302-318 of one or more vehicles. For example, as shown in FIG. 3B, six vehicle images 302-312 are displayed via interface 300. Each image of the six vehicle images may demonstrate a specific type of vehicle. Additional information (e.g., the make, the color, and/or or the number of doors) regarding the one or more vehicles may be displayed to the user. For instance, the image 302 shows a vehicle having a first make (e.g., MAKE 1), having M 2-doors, and having a black exterior, while the image 306 shows a vehicle having the first make (e.g., MAKE 1), having 4-doors, and having a black exterior. As shown in FIGS. 3A-3B, such information may be displayed below a given image of the one or more vehicle images 302-318. In this example, the user device 150 may be a laptop executing software. The software interface or user interface 300 may be displayed to the user after the user selects the one or more vehicle images. In other embodiments, similar information to that illustrated in FIGS. 3A-3B may be presented in a different format via software executing on an electronic device (e.g., a desktop, mobile phone, or tablet computer) serving as the user device 150. Additionally, the user interface 300 may include one or more graphical elements, including, but not limited to, input controls (e.g., checkboxes, radio buttons, dropdown lists, list boxes, buttons, toggles, text fields, date field), navigational components (e.g., breadcrumb, slider, search field, pagination, slider, tags, icons), informational components (e.g., tooltips, icons, progress bar, notifications, message boxes, modal windows), or containers (e.g., accordion).

In one example, as a user selects one or more images on the user interface 300, the user-selected image may be enlarged relative to other non-selected images demonstrated on the user interface 300, bolded relative to other non-selected images demonstrated on the user interface 300, or marked with a check or some other indicator (e.g., a frame, highlight, underline). The user-selected images may be re-arranged to be positioned at the top of the screen, the middle of the screen, or the bottom of the screen. After the user selects the one or more vehicle images, the non-selected images may fade, not be bolded, or not include an indicator, which may suggest that the non-selected images are not preferred by the user. After the user selects one or more images, the non-selected images may be replaced by one or more new vehicle images based on the user-selected images. Such one or more new vehicle images may include vehicles that are similar to the vehicles presented in the user-selected images. In FIGS. 3A-3B, the user may first be presented with user interface 300 in FIG. 3A, and the user may select images 302 (a Make 1 2-door black vehicle), 306 (a Make 1 4-door black vehicle), and 308 (a Make 1 2-door black vehicle), which may include a frame 301 as an indicator that the images 302, 306, and 308 are selected by the user. Based on the user-selected images 302, 306, and 308, the one or more algorithms may determine that user preference data may include a Make 1 black vehicle and the user may be indifferent to the door number of the vehicle. In this situation, the user interface 300 may be updated to replace the non-selected images 304, 310, and 312 with one or more new vehicle images that are similar to the user-selected images. Such an updated user interface 300, as shown in FIG. 3B, may keep the user-selected images 302, 306, and 308, and include new vehicle images 314, 316, and 318. The user may then repeat to select one or more images displayed on the user interface 300 in FIG. 3B.

In another example, after user selects a subset of the one or more vehicle images displayed on the user interface, all the one or more vehicle images may be replaced with one or more new vehicle images based on the subset of the one or more vehicle images. Such one or more new vehicle images may include vehicles that are similar to the vehicles presented in the subset of the one or more vehicle images. The user may be presented with user interface 300 in FIG. 3A, and the user may select images 302 (a Make 1 2-door black vehicle), 306 (a Make 1 4-door black vehicle), and 308 (a Make 1 2-door black vehicle), which may include a frame 301 as an indicator that the images 302, 306, and 308 are selected by the user. Based on the user-selected images 302, 306, and 308, the one or more algorithms may determine that user preference data may include a Make 1 black vehicle and the user may be indifferent to the door number of the vehicle. Next, an updated user interface may not keep any of the vehicle images 302-312, but replace all the vehicle images 302-312 with one or more new vehicle images that include vehicles similar to the vehicles presented in the user-selected images. The user may then repeat to select one or more new vehicle images displayed on the updated user interface. In any situation, the process of selecting one or more vehicle images may be an iterative process. After a sufficient number or a predetermined threshold number of selections (e.g., the user repeats the selecting process 6 times and the user interface has been updated 6 times) is made by the user, the one or more algorithms may be able to generate user preference data or vehicle recommendation with high precision (e.g., above a predetermined confidence level). Alternatively, the iterative process may continue until the user determines that all the images on the user interface 300 are related to vehicles preferred by the user.

Returning to FIG. 2, step 203 may include identifying, via the one or more processors, one or more first-level attributes from the one or more user-selected images. The one or more first-level attributes may be identified directly from the one or more user-selected images. The step of identifying may be done via one or more algorithms (e.g., via algorithm model 112). The one or more algorithms may include a trained machine learning algorithm (e.g., a natural language processing or convolutional neural network). In some embodiments, the identifying one or more first-level attributes may also include obtaining user inputs. For instance, the user may define, among one or more first-level attributes, a subset of the one or more first-level attributes that are more favorable to the user. The one or more first-level attributes may include at least one of a make, a model, a color, a door count, or a seat count of one or more vehicles indicated via the one or more user-selected images. The one or more first-level attributes may further include at least one of a weight, a mileage, or a height of the one or more vehicles indicated via the one or more user-selected images.

The one or more first-level attributes may include additional exterior features such as a wheel feature, a color feature, a shape feature, vehicle class (e.g., convertible, coupe, sedan, hatchback, sport-utility vehicle, cross-over, minivan, van, or wagon), rear luggage compartment volume, door features (e.g., falcon wing doors, or automatic doors), light features (e.g., color and shape of the tail light), towing capacity (e.g., 4000 lbs. towing limit), mirror features (e.g., shape of the rear mirror, heated side mirrors), sensor and monitor features (e.g., including proximity sensors, humidity sensors, or temperatures sensors), or roof features (e.g., sun roof, moon roof, panoramic roof). The wheel feature may include, for example, the size (e.g., the diameter and width), the brand, the type, the safety level, the rim, the hubcap, or the material of the wheel. The color feature may include any information regarding colors or finishes of the exterior of the vehicle. The colors may include, by way of example, red, white, blue, black, silver, gold, yellow, orange, pink, green, or gray. The finishes of the exterior may include, for example, matte finish, pearlescent finish, metallic finish, or gloss finish. The shape feature of the vehicle may include the shape of any portion of the exterior of the vehicle, including, the shape of the front side of the vehicle, the shape of the flank side of the vehicle, or the shape of the back side of the vehicle.

The one or more first-level attributes may include additional interior features such as a material feature, an electronics feature, an engine feature, an add-on feature of the vehicle, the performance of the vehicle (e.g., track speed, 0-60 mph), the history of the vehicle (e.g., years of manufacturing, mileage), service features (e.g., 4 years of warranty), or break features. The material feature may include any information regarding the material of the interior of a vehicle, including, for example, the material of the seats (e.g., leather, cloth, suede, etc.). The electronics feature may include any information regarding electronics in the vehicle, including, for example, audio and multi-media (e.g., in-vehicle internet streaming music and media), internet browser, navigation system, on-board safety or convenience features (e.g., emergency breaking, self-driving, lane assist, self-parking). The engine feature may include any information regarding the engine of the vehicle, including, but not limited to, types of engines (e.g., internal combustion engines, external combustion engines, hybrid engines, or electronic-powered engines), engine layout (e.g., front engine layout), maximum engine speed, max engine power, design and cylinders, valves, drivetrain type (e.g., 4-wheel drive, all-wheel drive, front-wheel drive, or rear-wheel drive), transmission type (e.g., automatic or manual), fuel type (e.g., diesel, electric, gasoline, hybrid, or flex-fuel), or max torque. The add-on feature may include any additional interior features of the vehicle, including, seat features (e.g., heated seat, cooled seat), steering wheel features (e.g., heated steering wheel, cooled steering wheel), interior door features (e.g., metal handle), or sun visor feature (e.g., with vanity mirrors).

Step 204 may include obtaining, via the one or more processors, one or more vehicle identifications from the one or more user-selected images. The one or more vehicle identifications may include one or more vehicle identification numbers (VINs). The vehicle identification number may be a unique code, including a serial number, used by the automotive industry to identify individual motor vehicles, towed vehicles, motorcycles, scooters and mopeds. The vehicle identification may be associated with any information about a vehicle stored in one or more databases. By using the vehicle identification, additional information of an individual vehicle may be obtained. Each vehicle may have a unique VIN. Such VINs may be extracted from one or more user-selected images using one or more algorithms. The one or more algorithms may include imaging processing algorithms. For instance, a vehicle identification may be shown on a certain part of the vehicle in a given vehicle image, and the one or more algorithms may capture and analyze the vehicle identification shown in the given vehicle image.

Step 205 may include determining, via the one or more processors, one or more second-level attributes based on the one or more vehicle identifications. The one or more second-level attributes may not be obtained directly from the one or more user-selected images. Instead, the one or more second-level attributes may be determined based on vehicle identification. In one example, since each vehicle may have a unique vehicle identification, the one or more second-level attributes may be determined based on characteristics or information of a vehicle associated with the unique vehicle identification. Such characteristics or information of a vehicle may be stored in one or more databases, and the vehicle identification may be used to access the characteristics or information of the vehicle. The VIN may be associated with any vehicle information stored in one or more databases associated with one or more resources 140 (e.g., a vehicle loan provider). By using the VIN, vehicle information may be obtained by connecting a unique VIN to an individual vehicle having such VIN. The one or more second-level attributes may include any information of the vehicle that can be obtained based on the vehicle identification, including, at least one of an engine type, a manufacturing region, or a manufacturing year of the one or more vehicles indicated via the one or more user-selected images. The one or more second-level attributes may further include at least a vehicle price of the one or more vehicles indicated via the one or more user-selected images.

Step 206 may include determining, via the one or more processors, a value of each of the one or more first-level attributes and the one or more second-level attributes via one or more algorithms. The one or more algorithms may determine a frequency of each of the one or more first-level attributes and/or the one or more second-level attributes encompassed in the one or more vehicles indicated via the one or more user-selected images. The value may be calculated based on such frequency. For instance, if a white color vehicle appears in six images among the one or more user-selected images, then the value of the color white may be six. Such frequency may be used to determine which subset of the one or more first-level attributes are more favorable to the user. Such frequency may also be used to determine which subset of the one or more second-level attributes appears more in one or more user-selected images. For instance, among ten vehicle images, the user selects five images. All of the five images may present a white vehicle, and three of the five images may present a coupe type. In this situation, the value of the color white may be five, the value of coupe type may be three, and the more favorable attributes may be a vehicle with a white color instead of a coupe type vehicle. In another example, among twenty vehicle images, the user may select ten images. All of the ten images may present a vehicle with specific engine type (e.g., electronic vehicle) based on unique identifications (e.g., VINS) of the selected ten images, and five of the ten images may present a vehicle manufactured in 2018. Thus, the more favorable attributes may be an electronic vehicle instead of a vehicle made in 2018. In this situation, the electronic vehicle and a vehicle made in 2018 may both be liked by the user, but the user may like the electronic vehicle more than a vehicle made in 2018. In yet another example, among a plurality of vehicle images the user selects, six of the images may represent a vehicle make A, five of the images may represent a four-door vehicle, two of the images may represent a two-door vehicle, one of the images may represent a black color vehicle, one of the images may represent a blue color vehicle, and one of the images may represent a red color vehicle. In this situation, the more favorable attributes may be a 4-door vehicle made by make A, less favorable attributes may be a 2-door vehicle made by make A, and the user may be indifferent among colors black, blue, and red of the vehicle. In some embodiments, different values may be assigned to different attributes (e.g., first-level or second-level attributes). For instance, the most frequently appearing features identified in user-selected images (e.g., attributes that appear in every user-selected image) may be assigned a value of 5 on a scale of 1 to 5, consistently but less frequently appearing features in user-selected images (e.g., attributes that appear in 50% of user-selected images) may be assigned a value of 3 on the scale of 1 to 5, and indifferently appearing features in user-selected images (e.g., attributes that appear in 10% of user-selected images and 10% of non-selected images) may be assigned as a value of 1 on the scale of 1 to 5. In another example, the value of the attribute may be equal to how many times such attribute appears in user-selected images. In this situation, if one attribute appears in 10 user-selected images, then the value of the attribute may be 10, and the attribute with the highest value may be considered most favorable to the user.

Step 207 may include determining, via the one or more processors, the vehicle recommendation based on the value of each of the one or more first-level attributes and the one or more second-level attributes. In one example, the user may select five images among ten vehicle images and all of the five images may present a white vehicle, and three of the five images may present a coupe type vehicle. In this situation, the vehicle recommendation may be a vehicle with a white color instead of a coupe type vehicle. The determining the vehicle recommendation may include real-time updating the vehicle recommendation based on user interaction with one or more vehicle images. For instance, after a user selects one or more vehicle images, an updated user interface may be presented to the user with updated one or more vehicle images based on the one or more vehicle images that the user selects (e.g., the one or more user-selected images), as described in FIGS. 3A and 3B. The updated one or more vehicle images may include one or more first-level attributes and/or second-level attributes that are presented in the one or more vehicle images that the user has selected and/or may select. The updated one or more vehicle images may also include new first-level attributes and/or second-level attributes that are not presented in one or more vehicle images that the user has selected or may select. The determining the vehicle recommendation may include determining the vehicle recommendation via a trained machine learning algorithm. The trained machine learning algorithm may be configured to utilize principal component analysis. Details of the trained machine learning algorithm are described elsewhere herein.

The vehicle recommendation may include a recommended vehicle, or a plurality of recommended vehicles, available for purchase. The vehicle recommendation may include any information regarding the recommended vehicle (s) including, but not limited to, images, prices, models, makes, years of manufacturing, or mileages of the recommended vehicle(s). The vehicle recommendation may also include any information regarding one or more dealers who may sell the recommended vehicle(s), including, but not limited to, the names of the dealers or the addresses of the dealers. The vehicle recommendation may also include any information regarding purchasing a vehicle by the user, for example, a recommended location to purchase the recommended vehicle(s), or a recommended time to purchase the recommended vehicle(s). The vehicle recommendation may include upgrade or repair information specific to the recommended vehicle(s), news articles pertaining to the recommended vehicle(s), possible substitute or compatible items for the recommended vehicle(s), and so forth. Although a vehicle recommendation is described herein as an example, the method can be utilized to provide recommendation for other products. The product may be any item or service sold by a merchant.

At any stage of providing the recommendation to a user, the method may further include updating, via the one or more processors, the one or more user-selected images based on the value of each of the one or more first-level attributes and the one or more second-level attributes via one or more algorithms and a predetermined threshold value. The method may then include determining, via the one or more processors, the vehicle recommendation based on one or more updated user-selected images. The predetermined threshold value may be set by the user or the one or more algorithms. The predetermined threshold value may be an integer that indicates how many times one of the one or more first-level attributes appears and/or second-level attributes defined in the one or more user-selected images. The predetermined threshold value may be an integer representing a minimum value that a value of a first-level attribute or a second-level attribute needs to satisfy to be considered as more favorable by the user. In one example, if a value of one of the one or more first-level attributes and/or second-level attributes (e.g., a black color vehicle) satisfies a predetermined threshold value (e.g., is equal to or exceeds the predetermined threshold), then the one of the one or more first-level attributes and/or second-level attributes may remain in the user-selected images and/or the updated images (e.g., new vehicle images discussed with FIG. 3B). In another example, if the value that the vehicle is made in 2018 by manufacture A satisfies a predetermined threshold value, all the one or more non-selected images may be updated to include vehicles made by manufacture A made in 2018. In yet another example, if the value that a white coupe vehicle satisfies a predetermined threshold value, then all the one or more vehicle images may be updated to include white coupe vehicles.

Step 208 may include transmitting, to the device associated with the user, a notification indicating the vehicle recommendation. The notification indicating the vehicle recommendation may include an image of one or more recommended vehicles. The notification may be configured to be displayed on the user interface of the device associated with the user (user device 150). The notification may include an interactive feature configured to enable the user to accept or reject the vehicle recommendation. The notification may include information regarding the vehicle recommendation. The notification may be displayed in a user interface. In some embodiments, the notification may be configured to be displayed on a display screen of a user device associated with the user (e.g., user device 150). The notification may be displayed on the display screen in any suitable form, such as an e-mail, a text message, a push notification, content on a webpage, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor.

Figure 4:
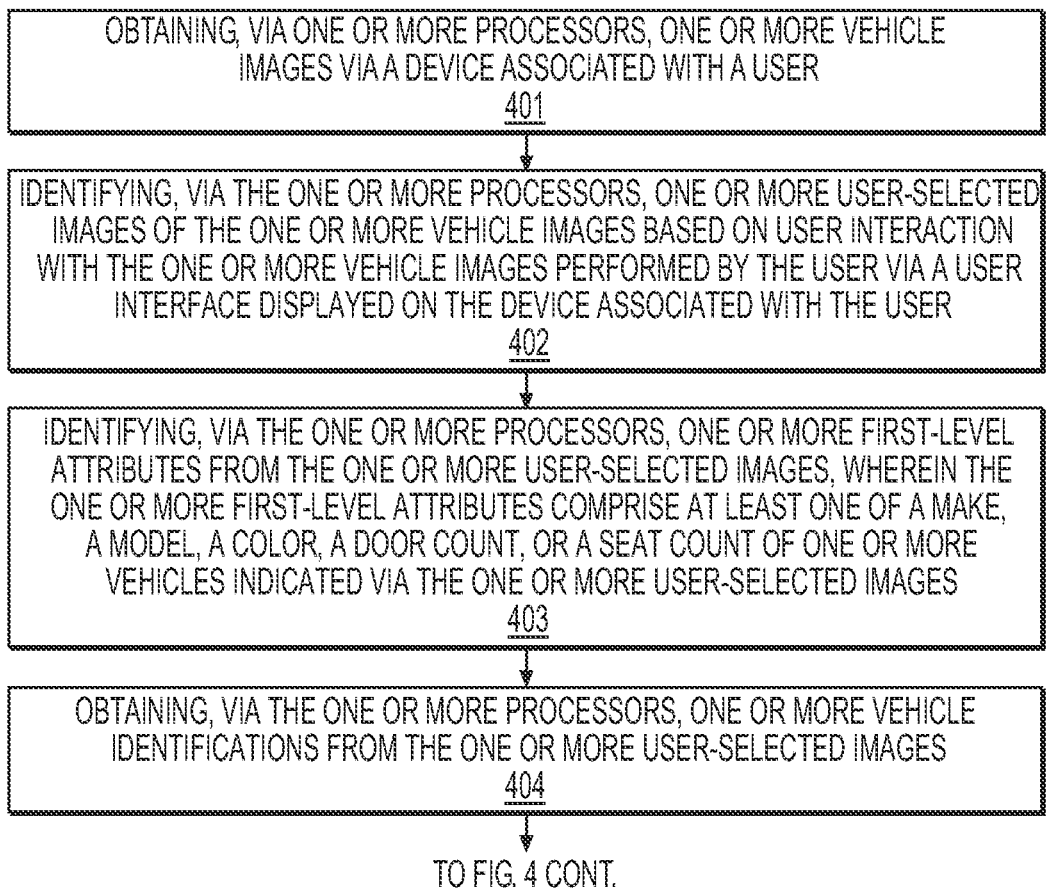
FIG. 4 depicts a flowchart of another exemplary method of providing a vehicle recommendation to a user, according to one or more embodiments.
Figure 4:
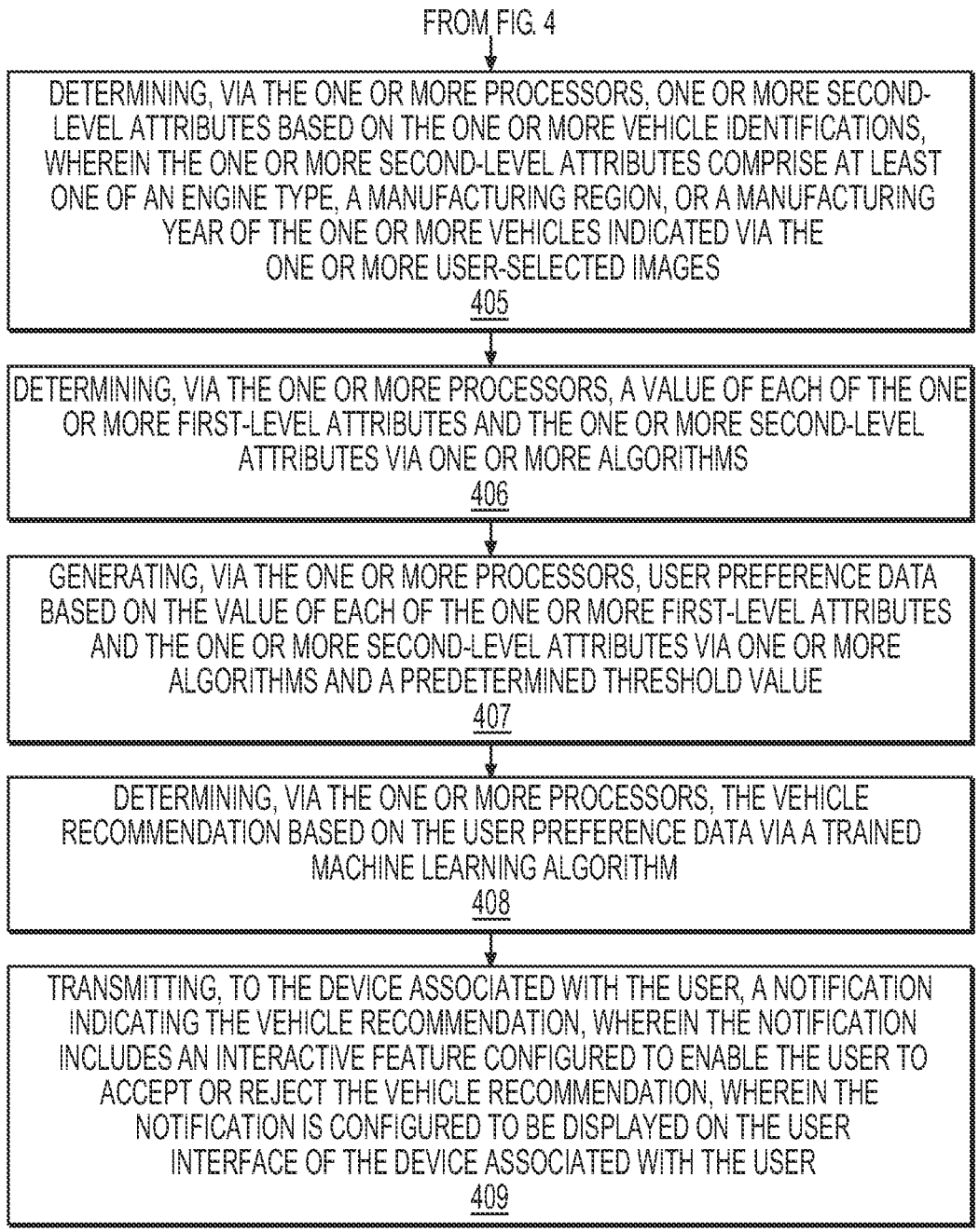

FIG. 4 is a flowchart illustrating another exemplary method for providing a vehicle recommendation to the user, according to one or more embodiments of the present disclosure. The method may be performed by computer system 110.

Step 401, similarly to step 201, may include obtaining, via one or more processors, one or more vehicle images via a device associated with the user (e.g., user device 150). A given vehicle image of the one or more vehicle images may include at least a picture of a vehicle. Step 402, similarly to step 202, may include identifying, via the one or more processors, one or more user-selected images of the one or more vehicle images based on user interaction with the one or more vehicle images performed by the user via a user interface displayed on the device associated with the user. Step 403, similarly to step 203, may include identifying, via the one or more processors, one or more first-level attributes from the one or more user-selected images. The one or more first-level attributes may include at least one of a make, a model, a color, a door count, or a seat count of one or more vehicles indicated via the one or more user-selected images. Step 404, similarly to step 204, may include obtaining, via the one or more processors, one or more vehicle identifications from the one or more user-selected images. Step 405, similarly to step 205, may include determining, via the one or more processors, one or more second-level attributes based on the one or more vehicle identifications. The one or more second-level attributes may include at least one of an engine type, a manufacturing region, or a manufacturing year of the one or more vehicles indicated via the one or more user-selected images. Step 406, similarly to step 206, may include determining, via the one or more processors, a value of each of the one or more first-level attributes and the one or more second-level attributes via one or more algorithms. Details of one or more vehicle images, one or more user-selected images, one or more first-level attributes, one or more vehicle identifications, one or more second-level attributes, and the values are described elsewhere herein.

Step 407 may include generating, via the one or more processors, user preference data based on the value of each of the one or more first-level attributes and the one or more second-level attributes via one or more algorithms and a predetermined threshold value. The user preference data may include one or more parameters relating to a user's preferences regarding a certain vehicle. For example, user preference data may include information relating to which first-level attributes or second level attributes of a vehicle the user prefers. Such information may include, but are not limited to, make of vehicle (e.g., Fiat, General Motors, Ford, Nissan, Hyundai, Toyota, BMW, Subaru, Volkswagen, Jaguar Land Rover, etc.), model of vehicle (e.g., Fiat Jeep Cherokee, Chevrolet Malibu, Ford Focus, Nissan Leaf, Hyundai Sonata, Toyota Corolla, BMW 328i, Subaru Outback, Volkswagen Jetta, Jaguar F-type), size of the vehicle (e.g., compact, mid-size, full, minivan, truck, or sport-utility vehicle (SUV)), vehicle color, vehicle door count, value of vehicle (e.g., a value identified by a standardized market value database), condition of vehicle, an engine type, a manufacturing region, a manufacturing year (e.g., a specific iteration of a model, or a parameter related to the year of manufacture of the vehicle), and/or luxury features of the vehicle (e.g., side air bags, sun roof, four-wheel drive, etc.). User preference data may further include a class, tier, or group of vehicle manufacturers, such as, for example, economy value manufacturers, mid-tier manufacturers, or luxury or high-end manufacturers. User preference data may include first-level attributes or second-level attributes related to the condition of a vehicle.

The predetermined threshold value may be set by the user or the one or more algorithms. The predetermined threshold value may be an integer that indicates how many times one of the one or more first-level attributes and/or second-level attributes appears in the one or more user-selected images. The predetermined threshold value may be an integer representing a minimum value that a value of a first-level attribute or a second-level attribute needs to meet to be considered as more favorable by the user. For instance, a predetermined threshold value is four, a value of the make of the vehicle as make A is six (e.g., the make A appears in 6 images among the one or more user-selected images), a value of four-door vehicle is five, and a value of black color vehicle is one; then the user preference data including the more favorable attributes may include a four-door vehicle and a make A vehicle.

At any stage of providing a vehicle recommendation to a user, the method may further include updating, via one or more processors, the one or more images presented on a user interface based on the user preference data. For instance, the user preference data may indicate that more favorite attributes include a make A four-door vehicle. In this situation, all the one or more non-selected images may be updated to include a make A four-door vehicle. In another example, the user preference data may indicate that more favorite attributes include a white color coupe type vehicle. In this situation, all the one or more images may be updated to include a white color coupe type vehicle.

Step 408 may include determining, via the one or more processors, the vehicle recommendation based on the user preference data via a trained machine learning algorithm. The trained machine learning algorithm may include a regression-based model that accepts the one or more vehicle images, one or more user-selected images, one or more first-level attributes, one or more vehicle identifications, one or more second-level attributes, values of one or more first-level attributes and/or second-level attributes, user preference data, and/or vehicle recommendation as input data. The trained machine learning algorithm may be part of the algorithm model 112. The trained machine learning algorithm may be of any suitable form, and may include, for example, a neural network. A neural network may be software representing a human neural system (e.g., cognitive system). A neural network may include a series of layers termed "neurons" or "nodes." A neural network may comprise an input layer, to which data is presented, one or more internal layers, and an output layer. The number of neurons in each layer may be related to the complexity of a problem to be solved. Input neurons may receive data being presented and then transmit the data to the first internal layer through the connections' weight. The trained machine learning algorithm may include a convolutional neural network (CNN), a deep neural network, or a recurrent neural network (RNN).

A CNN may be a deep and feed-forward artificial neural network. A CNN may be applicable to analyzing visual images, such as the one or more vehicle images or one or more user-selected images, described elsewhere herein. A CNN may include an input layer, an output layer, and multiple hidden layers. Hidden layers of a CNN may include convolutional layers, pooling layers, or normalization layers. Layers may be organized in three dimensions: width, height, and depth. The total number of convolutional layers may be at least about 3, 4, 5, 10, 15, 20 or more. The total number of convolutional layers may be at most about 20, 15, 10, 5, 4, or less.

Convolutional layers may apply a convolution operation to an input and pass results of a convolution operation to a next layer. For processing images, a convolution operation may reduce the number of free parameters, allowing a network to be deeper with fewer parameters. In a convolutional layer, neurons may receive input from only a restricted subarea of a previous layer. A convolutional layer's parameters may comprise a set of learnable filters (or kernels). Learnable filters may have a small receptive field and extend through the full depth of an input volume. During a forward pass, each filter may be convolved across the width and height of an input volume, compute a dot product between entries of a filter and an input, and produce a 2-dimensional activation map of that filter. As a result, a network may learn filters that activate when detecting some specific type of feature at some spatial position as an input.

An RNN may be configured to receive sequential data (e.g., user feedback data) as an input, such as consecutive data inputs, and the RNN may update the internal state at every time step. An RNN can be applicable to tasks such as image captioning or time series anomaly detection. The RNN may include a fully recurrent neural network, independently recurrent neural network, Jordan networks, Echo state, neural history compressor, gated recurrent unit, multiple timescales model, differentiable neural computer, or any combination thereof.

The trained machine learning algorithm may compute the vehicle recommendation as a function of the one or more vehicle images, one or more user-selected images, one or more first-level attributes, one or more vehicle identifications, one or more second-level attributes, values of one or more first-level attributes and/or second-level attributes, user preference data, or one or more variables indicated in the input data. The one or more variables may be derived from the one or more vehicle images, one or more user-selected images, one or more first-level attributes, one or more vehicle identifications, one or more second-level attributes, values of one or more first-level attributes and/or second-level attributes, or user preference data. This function may be learned by training the machine learning algorithm with training sets.

The machine learning algorithm may be trained by supervised, unsupervised, or semi-supervised learning using training sets comprising data of types similar to the type of data used as the model input. For example, the training set used to train the model may include any combination of the following: the one or more vehicle images, one or more user-selected images or images selected by third-parties other than the user, one or more first-level attributes associated with user-selected images or images selected by third-parties other than the user, one or more vehicle identifications associated with user-selected images or images selected by third-parties other than the user, one or more second-level attributes associated with vehicle identifications, user-selected images or images selected by third-parties other than the user, values of one or more first-level attributes and/or second-level attributes, user preference data, or vehicle recommendation to the user or to the third-parties other than the user. Additionally, the training set used to train the model may further include user data, including, but not limited to, demographic information of the user or other data related to the user. Accordingly, the machine learning model may be trained to map input variables to a quantity or value of a vehicle recommendation for the user. That is, the machine learning model may be trained to determine a quantity or value of the vehicle recommendation of the user as a function of various input variables.

At any stage of providing a vehicle recommendation to a user, the method may further include determining, via the one or more processors, the vehicle recommendation based on one or more updated user-selected images. For instance, the user preference data may indicate that more favorable attributes may include a white color coupe type vehicle. In this situation, all the one or more non-selected images may be updated to include a white color coupe type vehicle. Based on the updated images presented on the user interface, the vehicle recommendation may be determined as a white color coupe type vehicle.

Step 409 may include transmitting, to the device associated with the user, a notification indicating the vehicle recommendation. The notification may include an interactive feature configured to enable the user to accept or reject the vehicle recommendation. The notification may be configured to be displayed on the user interface of the device associated with the user. The notification indicating the vehicle recommendation may include an image of a recommended vehicle. The notification may include an interactive feature configured to enable the user to accept or reject the vehicle recommendation. The notification may include information regarding the vehicle recommendation. The notification may be displayed in a user interface. In some embodiments, the notification may be configured to be displayed on a display screen of a user device associated with the user (e.g., user device 150). The notification may be displayed on the display screen in any suitable form, such as an e-mail, a text message, a push notification, content on a webpage, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor.

At any stage of providing a vehicle recommendation, the method may further include storing the one or more vehicle images, one or more user-selected images, one or more first-level attributes, one or more vehicle identifications, one or more second-level attributes, values of one or more first-level attributes and/or second-level attributes, user preference data, or vehicle recommendation for subsequent analysis. The stored data may have an expiration period. The expiration period may be at least 1 day, 1 week, 1 month, 1 quarter, 1 year, or longer. In other embodiments, the expiration period may be at most 1 year, 1 quarter, 1 month, 1 week, 1 day, or shorter. The subsequent analysis may include analyzing the vehicle recommendation to update the one or more vehicle images, one or more user-selected images, one or more first-level attributes, one or more vehicle identifications, one or more second-level attributes, values of one or more first-level attributes and/or second-level attributes, or user preference data. The stored data may also be one of the one or more variables used in training a trained machine learning model. Details of the trained machine learning model are described elsewhere herein.

The method disclosed herein may provide a vehicle recommendation to a user efficiently. For instance, by enabling the user to interact with images of a vehicle presented on a user interface, available vehicles may be sorted, removed, or selected without requiring the user to manually select one or more filters (e.g., typing in a search box, or choosing from a drop down menu) to select vehicles, especially when the user is unsure which filter to type or select. The method disclosed herein may provide a user a real-time vehicle recommendation while the user is in the process of selecting one or more images presented on the user interface. With each selection of images made by the user, the method may update the images presented on the user interface with one or more new vehicle images that include one or more vehicles that are similar to the images selected by the user (e.g., user-selected images). Such similarity may be determined by one or more first-level attributes or one or more second-level attributes defined in the images selected by the user. After a few selections (e.g., selecting images) made by the user, attributes can be ordered or mapped based on which attributes appear the most or above a predetermined threshold in the images selected by the user. Attributes can also be clustered or grouped together based on how many times the attributes appear in the images selected by the user. As the process of a user selecting images continues, the vehicle recommendation may be increasingly personalized.

In general, any process discussed in this disclosure that is understood to be computer-implementable, such as the processes illustrated in FIGS. 2 and 4, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as computer system 110 and/or user device 150, may include one or more computing devices. If the one or more processors of the computer system 110 and/or user device 150 are implemented as a plurality of processors, the plurality of processors may be included in a single computing device or distributed among a plurality of computing devices. If computer system 110 and/or user device 150 comprises a plurality of computing devices, the memory of the computer system 110 may include the respective memory of each computing device of the plurality of computing devices.

Figure 5:
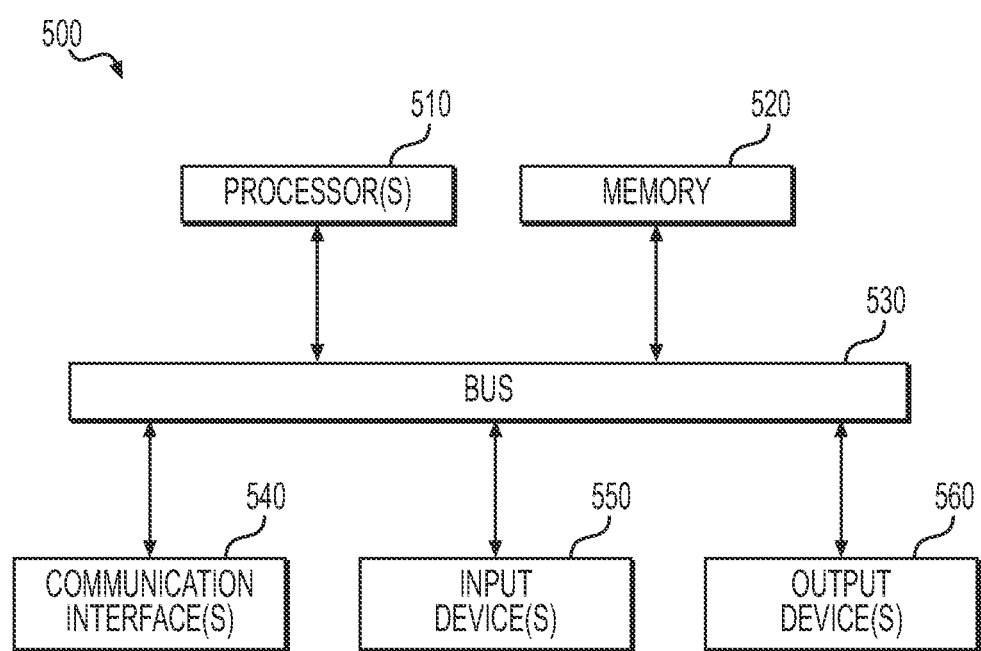
FIG. 5 depicts an example of a computing device, according to one or more embodiments.

FIG. 5 illustrates an example of a computing device 500 of a computer system, such as computer system 110 and/or user device 150. The computing device 500 may include processor(s) 510 (e.g., CPU, GPU, or other such processing unit(s)), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more busses. In some embodiments, the processor(s) 510 of the computing device 500 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for providing a vehicle recommendation to a user, the method comprising:
   providing a first set of vehicle images from a plurality of vehicle images for display on a user interface of a device associated with a user;
   receiving an indication of one or more first user-selected vehicle images from the first set via the user interface;
   identifying a first plurality of vehicle attributes from the one or more first user-selected vehicle images;
   determining a frequency that each vehicle attribute of the first plurality of vehicle attributes appears in the one or more first user-selected vehicle images from the first set;
   determining a value of each vehicle attribute of the first plurality of vehicle attributes based on the frequency;
   providing a second set of vehicle images from the plurality of vehicle images for display on the user interface, the providing causing one or more non-user-selected vehicle images from the first set that are displayed on the user interface to be replaced, on the user interface, with one or more new vehicle images included in the second set;
   receiving an indication of one or more second user-selected vehicle images from the one or more new vehicle images via the user interface, wherein a second plurality of vehicle attributes identified from the one or more second user-selected vehicle images include at least a portion of the first plurality of vehicle attributes;
   based on the selection of the one or more second user-selected vehicle images, updating the value of each vehicle attribute of the portion of the first plurality of vehicle attributes;
   determining, using a trained neural network, a vehicle recommendation based, at least in part, on the updated value of each vehicle attribute of the portion of the first plurality of vehicle attributes, wherein the trained neural network is a convolutional neural network having a plurality of layers, including one or more convolutional layers that each apply a convolution operation to a respective input received by the convolutional layer for output to a next layer of the plurality of layers; and
   transmitting, to the device associated with the user, a notification indicating the vehicle recommendation.

2. The computer-implemented method of claim 1, wherein identifying the first plurality of vehicle attributes from the one or more first user-selected vehicle images comprises:
   identifying one or more first-level vehicle attributes and one or more second-level vehicle attributes.

3. The computer-implemented method of claim 2, wherein identifying the one or more first-level vehicle attributes comprises:
   identifying the one or more first-level vehicle attributes from the one or more first user-selected vehicle images, wherein the one or more first-level vehicle attributes comprise at least one of a make, a model, a color, a door count, a seat count, a weight, a mileage, or a height of one or more vehicles indicated via the one or more first user-selected vehicle images.

4. The computer-implemented method of claim 2, wherein identifying the one or more second-level vehicle attributes comprises:
   obtaining one or more vehicle identifications from the one or more first user-selected vehicle images; and
   determining the one or more second-level vehicle attributes based on the one or more vehicle identifications, wherein the one or more second-level vehicle attributes comprise at least one of an engine type, a manufacturing region, a manufacturing year, or a vehicle price of one or more vehicles indicated via the one or more first user-selected vehicle images.

5. The computer-implemented method of claim 1, further comprising:
determining the one or more new vehicle images based on the value of each vehicle attribute of the first plurality of vehicle attributes and a predetermined threshold value.

6. The computer-implemented method of claim 1, wherein determining the vehicle recommendation comprises:
determining the vehicle recommendation further based on one or more of: the first set of vehicle images, the one or more first user-selected vehicle images, the first plurality of vehicle attributes, the value for each vehicle attribute of the first plurality of vehicle attributes, the one or more new vehicle images, the one or more second user-selected vehicle images, the second plurality of vehicle attributes, or a value determined for each vehicle attribute of the second plurality of vehicle attributes.

7. The computer-implemented method of claim 1, wherein the first plurality of vehicle attributes include the portion of the first plurality of vehicle attributes and one or more additional attributes, and determining the vehicle recommendation comprises:
determining the vehicle recommendation further based on the value of the one or more additional attributes.

8. The computer-implemented method of claim 1, wherein the second plurality of vehicle attributes include a first portion of vehicle attributes corresponding to the portion of the first plurality of vehicle attributes, and a second portion of vehicle attributes including one or more different attributes from the first plurality of vehicle attributes, and determining the vehicle recommendation comprises:
determining a value of each vehicle attribute of the first portion of vehicle attributes and the second portion of vehicle attributes, wherein the value of each vehicle attribute of the portion of the first plurality of vehicle attributes is updated based on the value determined for the corresponding attribute in the first portion of vehicle attributes; and
determining the vehicle recommendation further based on the value determined for each vehicle attribute in the second portion of vehicle attributes.

9. The computer-implemented method of claim 1, further comprising:
determining the first set of vehicle images from the plurality of vehicle images to provide for display based on user interactions with the first set.

10. The computer-implemented method of claim 1, wherein at least a portion of the plurality of vehicle images are images captured by and obtained from the device associated with the user.

11. The computer-implemented method of claim 1, wherein the one or more first user-selected vehicle images and the one or more non-user-selected vehicle images from the first set that are displayed on the user interface are caused to be replaced, on the user interface, with the one or more new vehicle images included in the second set.

12. The computer-implemented method of claim 1, further comprising:
receiving user feedback data associated with the vehicle recommendation; and
updating the trained neural network based on the user feedback data.

13. A computer-implemented method for providing a vehicle recommendation to a user, the method comprising:
providing a first set of vehicle images from a plurality of vehicle images for display on a user interface of a device associated with the user;
receiving an indication of one or more first user-selected vehicle images from the first set via the user interface;
identifying a first plurality of vehicle attributes from the one or more first user-selected vehicle images;
determining a value of each vehicle attribute of the first plurality of vehicle attributes;
generating user preference data based on the value of each vehicle attribute of the first plurality of vehicle attributes;
providing a second set of vehicle images from the plurality of vehicle images for display on the user interface, the providing causing one or more non-user-selected vehicle images from the first set that are displayed on the user interface to be replaced, on the user interface, with one or more new vehicle images included in the second set, wherein one of:
the one or more new vehicle images replace an entirety of the first set of vehicle images; or
the one or more new vehicle images of the second set replace only the one or more non-user-selected vehicle images from the first set;
receiving an indication of one or more second user-selected vehicle images from the one or more new vehicle images via the user interface, wherein a second plurality of vehicle attributes identified from the one or more second user-selected vehicle images include at least a portion of the first plurality of vehicle attributes;
based on the selection of the one or more second user-selected vehicle images, updating the value of each vehicle attribute of the portion of the first plurality of vehicle attributes;
updating the user preference data based on the updated value of each vehicle attribute of the portion of the first plurality of vehicle attributes;
providing at least one or more of the plurality of vehicle images and the updated user preference data as input to a trained machine learning system comprising a neural network trained to determine one or more vehicles to recommend to the user based on the input, wherein the neural network is a convolutional neural network having a plurality of layers, including one or more convolutional layers that each apply a convolution operation to a respective input received by the convolutional layer for output to a next layer of the plurality of layers;
receiving, as output of the trained machine learning system, a vehicle recommendation including the determined one or more vehicles; and
transmitting, to the device associated with the user, a notification indicating the vehicle recommendation.

14. The computer-implemented method of claim 13, wherein the first plurality of vehicle attributes include one or more first-level vehicle attributes and one or more second-level vehicle attributes, and identifying the first plurality of vehicle attributes comprises:
identifying the one or more first-level vehicle attributes from the one or more first user-selected vehicle images;
obtaining one or more vehicle identifications from the one or more first user-selected vehicle images; and
determining the one or more second-level vehicle attributes based on the one or more vehicle identifications.

15. The computer-implemented method of claim 13, wherein determining the value of each vehicle attribute of the first plurality of vehicle attributes comprises:
- determining a frequency that each vehicle attribute of the first plurality of vehicle attributes appears in the one or more first user-selected vehicle images from the first set; and
- determining the value based on the frequency.

16. The computer-implemented method of claim 13, wherein the vehicle recommendation received as output of the trained machine learning system is further based on one or more of: the first set of vehicle images, the one or more first user-selected vehicle images, the first plurality of vehicle attributes, the value of each vehicle attribute of the first plurality of vehicle attributes, the one or more new vehicle images, the one or more second user-selected vehicle images, or the updated value of each vehicle attribute of the portion of the first plurality of vehicle attributes provided as further input to the trained machine learning system.

* * * * *